(12) United States Patent
Webb

(10) Patent No.: US 10,548,109 B2
(45) Date of Patent: Jan. 28, 2020

(54) OPPORTUNISTIC NETWORK-BASED LOCATION DETECTION USING UNSOLICITED DATA PACKETS

(71) Applicant: Cisco Technology, Inc., San Jose, CA (US)

(72) Inventor: Mark Allen Webb, Troy, MI (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 18 days.

(21) Appl. No.: 15/631,535

(22) Filed: Jun. 23, 2017

(65) Prior Publication Data

US 2018/0376449 A1 Dec. 27, 2018

(51) Int. Cl.
| | |
|---|---|
| *H04W 64/00* | (2009.01) |
| *G01S 19/49* | (2010.01) |
| *G01S 5/02* | (2010.01) |
| *G01S 5/00* | (2006.01) |
| *H04L 29/06* | (2006.01) |
| *G01S 19/46* | (2010.01) |

(52) U.S. Cl.
CPC ........... *H04W 64/003* (2013.01); *G01S 19/46* (2013.01); *H04L 69/22* (2013.01)

(58) Field of Classification Search
CPC ....... H04W 64/003; G01S 19/46; H04L 69/22
See application file for complete search history.

(56) References Cited

U.S. PATENT DOCUMENTS

| | | | |
|---|---|---|---|
| 7,831,259 B2 | 11/2010 | Cao et al. | |
| 8,238,935 B2 | 8/2012 | Chen et al. | |
| 8,335,173 B2 | 12/2012 | Hart et al. | |
| 8,520,540 B1* | 8/2013 | Foschiano | H04L 43/0852 370/252 |
| 8,913,552 B2 | 12/2014 | Agrawal et al. | |
| 9,055,395 B2 | 6/2015 | Hart et al. | |
| 9,155,062 B2 | 10/2015 | Traore et al. | |
| 9,246,954 B2 | 1/2016 | Koskelainen | |
| 9,253,748 B2 | 2/2016 | Goldin | |
| 9,432,312 B2 | 8/2016 | Dasgupta et al. | |

(Continued)

OTHER PUBLICATIONS

Oracle® Solaris Administration: IP Services Mar. 2013, Oracle.*

(Continued)

*Primary Examiner* — Noel R Beharry
*Assistant Examiner* — Wilfred Thomas
(74) *Attorney, Agent, or Firm* — Leon R. Turkevich

(57) ABSTRACT

In one embodiment, a method comprises a network device receiving one or more unsolicited data packets output by a plurality of source network devices, each unsolicited data packet comprising a corresponding link layer header and a corresponding network layer header; the network device parsing, from each unsolicited data packet within at least one of its corresponding link layer header or corresponding network layer header, a time type-length-value (TLV) element specifying a corresponding transmission time of the data packet from one or more corresponding source network devices, and a location TLV element specifying a corresponding location of the corresponding one or more source network devices; and the network device determining its corresponding location based on the time TLV elements and the location TLV elements parsed from the respective unsolicited data packets.

17 Claims, 4 Drawing Sheets

(56) References Cited

U.S. PATENT DOCUMENTS

| | | | | |
|---|---|---|---|---|
| 2003/0208524 | A1* | 11/2003 | Morman | H04L 69/22 |
| | | | | 709/201 |
| 2005/0108573 | A1* | 5/2005 | Bennett | H04L 63/0245 |
| | | | | 726/4 |
| 2008/0065775 | A1 | 3/2008 | Polk | |
| 2016/0105780 | A1* | 4/2016 | Hooker | H04L 65/1016 |
| | | | | 370/338 |
| 2016/0269972 | A1 | 9/2016 | Taneja | |
| 2017/0048815 | A1 | 2/2017 | Clarke et al. | |
| 2017/0187733 | A1* | 6/2017 | Ahn | H04L 61/1511 |

OTHER PUBLICATIONS

Valejo et al., "Short-range DGPS for Mobile Robots with Wireless Ethernet Links", [online], 1998 IEEE, [retrieved on Jun. 15, 2017]. Retrieved from the Internet: URL: <http://ap.isr.uc.pt/archive/120.pdf>, pp. 334-339.

Garner, "IEEE 1588 Version 2", [online], ISPCS Ann Arbor '08, Sep. 24, 2008, [retrieved on May 22, 2017]. Retrieved from the Internet: URL: <http://www.ieee802.org/1/files/public/docs2008/as-garner-1588v2-summary-0908.pdf>, pp. 1-89.

Thubert, Ed., "Reverse Routing Header", [online], 6MAN, Internet Draft, Dec. 10, 2010, [retrieved on Jun. 13, 2017]. Retrieved from the Internet: URL: <https://tools.ietf.org/pdf/draft-thubert-6man-reverse-routing-header-01.pdf>, pp. 1-25.

Weibel, "IEEE 1588 Standard for a Precision Clock Synchronization Protocol", [online], Nov. 11, 2012, IEEE 1588 Tutorial. [retrieved on May 22, 2017]. Retrieved from the Internet: URL< http://www.in2p3.fr/actions/formation/Numerique12/IEEE_1588_Tutorial_IN2P3_Handout.pdf>, pp. 1-148.

InsideGNSS, "GNSS Solutions: How important is GNSS observation weighting?", [online], Jan./Feb. 2007, [retrieved on Jun. 15, 2017]. Retrieved from the Internet: URL: <http://www.insidegnss.com/auto/JanFeb07GNSSSolutions%20(secured).pdf>, pp. 26-33.

Kassas et al., "Observability Analysis of Opportunistic Navigation with Pesudorange Measurements", [online], American Institute of Aeronautics and Astronautics, [retrieved on Jun. 15, 2017]. Retrieved from the Internet: URL: <https://pdfs.semanticscholar.org/12b4/22a16229b4a94d3b34db8bcce2909bf3bc74.pdf>, pp. 1-16.

Wikipedia, "Multilateration", [online], Mar. 24, 2017. [retrieved on Jun. 15, 2017]. Retrieved from the Internet: URL: <https://en.wikipedia.org/wiki/Multilateration>, pp. 1-11.

Mills et al., "Network Time Protocol Version 4: Protocol and Algorithms Specification", Internet Engineering Task Force (IETF), Request for Comments: 5905, Jun. 2010, pp. 1-110.

Winter, et al., "RPL: IPv6 Routing Protocol for Low-Power and Lossy Networks", Internet Engineering Task Force (IETF), Request for Comments: 6550, Mar. 2012, pp. 1-157.

Semtech, "Semtech's LoRa Geolocation Solution for Low Power Wire Area Networks is Now Available", [online], Jun. 30, 2016, [retrieved on Jun. 15, 2017]. Retrieved from the Internet: <URL: https://www.semtech.com/Press-Releases/2016/Semtech%E2%80%99s-LoRa%C2%AE-Geolocation-Solution-for-Low-Power-Wide-Area-Networks-is-Now-Available.html>, 2 pages.

Thingpark Wireless, "ThingPark Wireless PHY and MAC layer specifications", [online], [retrieved on Jun. 15, 2017]. Retrieved from the Internet: URL:< http://web.archive.org/web/20161020003219/http://cocoon.actility.com/system/files/wireless/ThingPark_Wireless%20PHY_and_MAC_layer_specifications_v1.pdf>, pp. 1-24.

Topografix, "GPX 1.1 Schema Documentation", [online], [retrieved on Jun. 16, 2017]. Retrieved from the Internet: URL: <http://www.topografix.com/gpx/1/1/>, 14 pages.

Wikipedia, "Assisted GPS", [online] Apr. 2, 2017. [retrieved on Jun. 15, 2017]. Retrieved from the Internet: URL: >https://en.wikipedia.org/wiki/Assisted_GPS>, pp. 1-4.

Wikipedia, "Precision Time Protocol", [online], May 1, 2017, [retrieved on May 22, 2017]. Retrieved from the Internet: URL: <https://en.wikipedia.org/w/index.php?title=Precision_Time_Protocol&printable=yes>, pp. 1-8.

\* cited by examiner

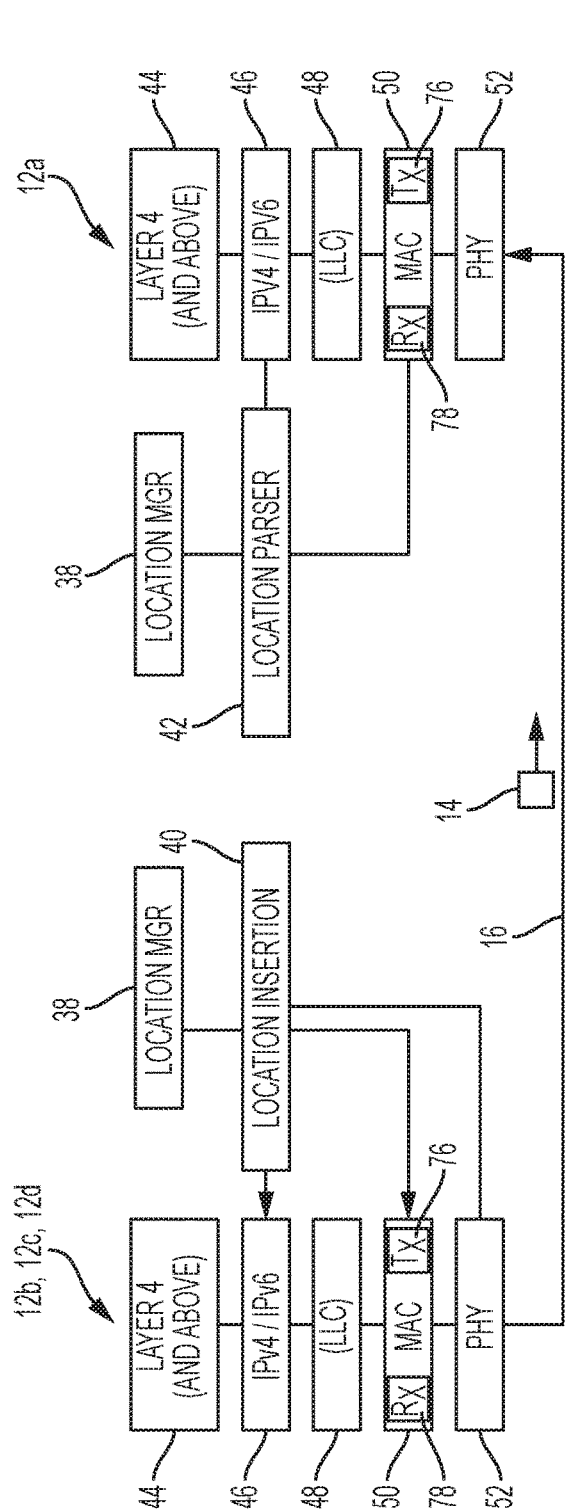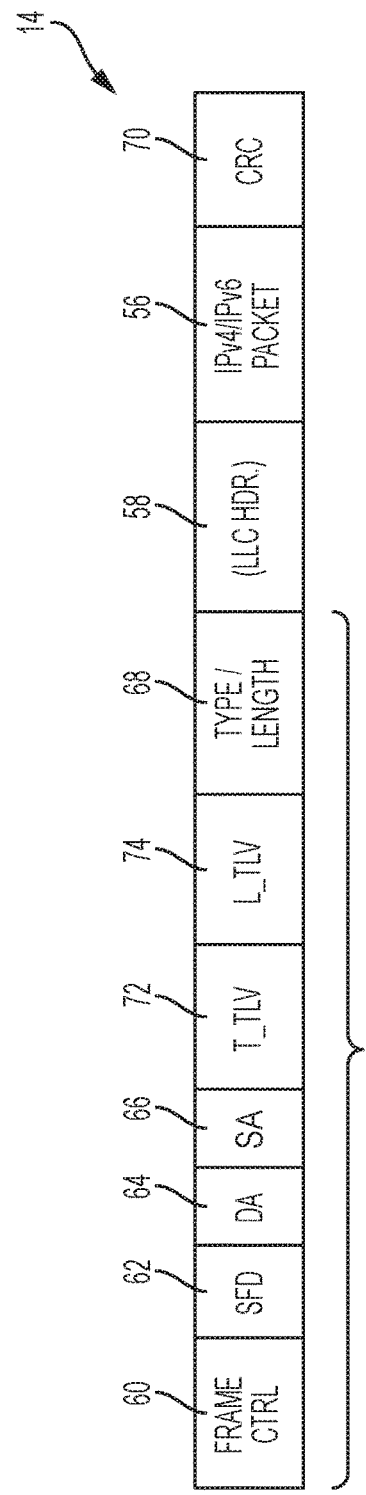
FIG. 4
FIG. 5A

OPPORTUNISTIC NETWORK-BASED LOCATION DETECTION USING UNSOLICITED DATA PACKETS

TECHNICAL FIELD

The present disclosure generally relates to opportunistic network-based location detection using unsolicited data packets.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Global Navigation Satellite Systems (GNSS) enabled devices rely on signal availability of Global Positioning System (GPS) satellites to determine a device location; hence, GPS satellite signal acquisition by a GNSS-enabled device is dependent on signal availability from multiple satellites. Consequently, a GNSS-enabled device cannot obtain an accurate GPS-based position without consistent acquisition of three or more GPS satellites. Location accuracy in a GNSS-enabled device also is limited to the GPS accuracy (e.g., three to ten meters).

A fundamental problem of GNSS-enabled devices is that GPS satellite signals are not available for indoor devices due to interference or obstructions by building infrastructure, etc.

BRIEF DESCRIPTION OF THE DRAWINGS

Reference is made to the attached drawings, wherein elements having the same reference numeral designations represent like elements throughout and wherein:

FIG. 4 illustrates in further detail an example insertion of a time type-length-value (TLV) element and a location TLV element into a link layer header and/or network layer header of an unsolicited data packet by a source network device, for opportunistic location detection by an apparatus receiving the unsolicited data packet, according to an example embodiment.

FIGS. 5A, 5B, and 5C illustrate example insertion of the time TLV element and location TLV element within a link layer header, within an Internet Protocol (IP) version 4 (IPv4) header, and within an IPv6 header, according to an example embodiment.

DESCRIPTION OF EXAMPLE EMBODIMENTS

Overview

Figure 1:
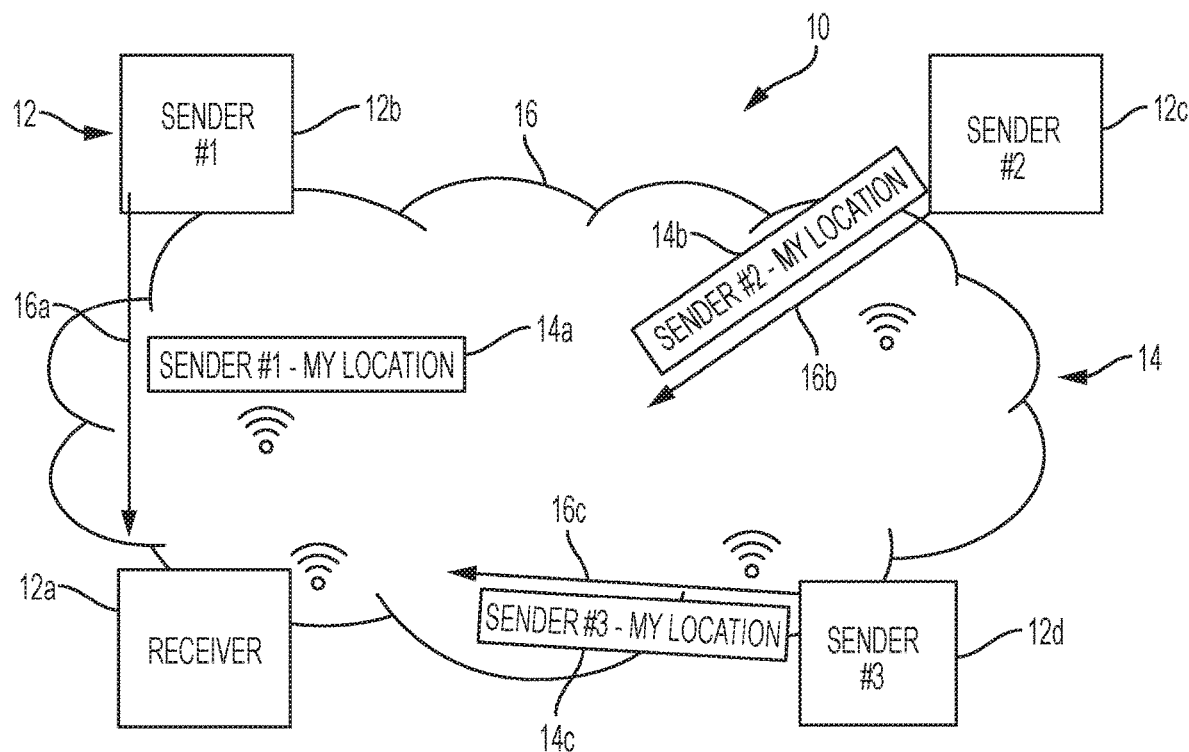
FIG. 1 illustrates an example system having an apparatus for opportunistic network-based location detection using neighbor location data from link layer and/or network layer headers of unsolicited data packets, according to an example embodiment.

In one embodiment, a method comprises a network device receiving one or more unsolicited data packets output by a plurality of source network devices, each unsolicited data packet comprising a corresponding link layer header and a corresponding network layer header; the network device parsing, from each unsolicited data packet within at least one of its corresponding link layer header or corresponding network layer header, a time type-length-value (TLV) element specifying a corresponding transmission time of the data packet from one or more corresponding source network devices, and a location TLV element specifying a corresponding location of the corresponding one or more source network devices; and the network device determining its corresponding location based on the time TLV elements and the location TLV elements parsed from the respective unsolicited data packets.

In another embodiment, an apparatus comprises a device interface circuit and a processor circuit. The device interface circuit is configured for receiving one or more unsolicited data packets output by a plurality of source network devices. Each unsolicited data packet comprises a corresponding link layer header and a corresponding network layer header. The processor circuit is configured for parsing, from each unsolicited data packet within at least one of its corresponding link layer header or corresponding network layer header, a time type-length-value (TLV) element specifying a corresponding transmission time of the data packet from one or more corresponding source network devices, and a location TLV element specifying a corresponding location of the corresponding one or more source network devices. The processor circuit further is configured for determining the corresponding location of the apparatus based on the time TLV elements and the location TLV elements parsed from the respective unsolicited data packets.

In another embodiment, one or more non-transitory tangible media are encoded with logic for execution by a machine, and when executed by the machine operable for: receiving, by the machine implemented as a network device, one or more unsolicited data packets output by a plurality of source network devices, each unsolicited data packet comprising a corresponding link layer header and a corresponding network layer header; the network device parsing, from each unsolicited data packet within at least one of its corresponding link layer header or corresponding network layer header, a time type-length-value (TLV) element specifying a corresponding transmission time of the data packet from one or more corresponding source network devices, and a location TLV element specifying a corresponding location of the corresponding one or more source network devices; and the network device determining its corresponding location based on the time TLV elements and the location TLV elements parsed from the respective unsolicited data packets.

DETAILED DESCRIPTION

Particular embodiments provide an opportunistic network-based location determination by a network device, where a network device can "opportunistically" determine its location based on parsing neighbor location data in the form of time-length-value (TLV) elements and location TLV elements solely from the link layer header and/or network layer header of received unsolicited data packets from an identified source network device. Each source network device can be configured for inserting, within each transmitted data packet (including unsolicited data packets), a time TLV element and a location TLV element within a link layer header of a link layer frame (e.g., a layer 2 Media Access Control (MAC) frame), and/or within a network layer header of a network layer packet (e.g., an IPv4 and/or IPv6 data packet). In other words, each transmitted data packet (including unsolicited data packets) can include, within its link/network layer header, its neighbor location data in the form of a time TLV and a location TLV for parsing by a receiving network device.

Consequently, a receiving network device can parse the time TLV elements and location TLV elements from the link layer header and/or the network layer header of each of the received data packets to obtain the neighbor location data from its respective neighboring source network devices, enabling the receiving network device to execute opportunistic network-based location determination, without requiring any request by the network device of any location information, without requiring any encapsulation information following the network layer header, or without any application level location detection by the network device.

Hence, the example embodiments enable a data network to be "location aware" based on the insertion of time TLV elements and location TLV elements within the link layer header and/or the network layer header of transmitted data packets, such that any network device can "opportunistically" determine its location merely by parsing the link and/or network layer headers of received data packets for neighbor location data, and executing "network-based triangulation" using the parsed neighbor location data. The network-based triangulation can include comparing reception times of data packets with the respective transmission times of the data packets from different locations. Hence, the example embodiments can provide location detection while eliminating the need for any dedicated request/response protocols between network devices, the need for any deep packet inspection within a payload of a network layer data packet, or the need for any encapsulation between protocol specific "gateways".

FIG. 1 is a diagram illustrating an example location-aware data network 10 having network devices 12 configured for sending and receiving data packets 14 containing neighbor location data within their respective link layer and/or network layer headers, according to an example embodiment. Each apparatus 12 is a physical machine (i.e., a hardware device) configured for implementing network communications with other physical machines 12 via wired or wireless data links 16 in the data network 10. The term "configured for" or "configured to" as used herein with respect to a specified operation refers to a device and/or machine that is physically constructed and arranged to perform the specified operation. Hence, the apparatus 12 is a network-enabled machine implementing network communications via the network 10.

FIG. 1 illustrates a receiving network device 12a receiving wired and/or wireless data packets 14 from each of a plurality of source network devices 12b, 12c, and 12d via a wired and/or wireless local area network 16, for example an IEEE 802.11 network. Any one of the network devices 12 can be implemented, for example, as a resource-constrained device, for example a resource-constrained network device having limited compute, memory, or power resources and that operates according to the Internet Engineering Task Force (IETF) Request for Comments (RFC) 6550. Any one of the network devices 12 can be implemented as a fixed (i.e., permanently stationary) device or a mobile device, for example as a movable "mote" or movable "robot".

According to example embodiments, each network device 12 can be configured to insert its neighbor location data within each link layer data packet 14 prior to transmission. The neighbor location data can be inserted within unsolicited data packets such as an unsolicited link-layer packet such as a WiFi-Direct Probe Request, an unsolicited network-layer packet such as an advertisement message according to RFC 6550 (e.g., Destination Advertisement Object (DAO), DODAG Information Object (DIO)), a network-layer packet carrying payload data, etc. Hence, the neighbor location data enables the receiving network device 12a to opportunistically determine the location of each of its neighboring source network devices 12b, 12c, and/or 12d based on the neighbor location data located solely in the link layer header and/or the network layer header of the received link layer data packets 14a, 14b, and/or 14c.

Figure 2:
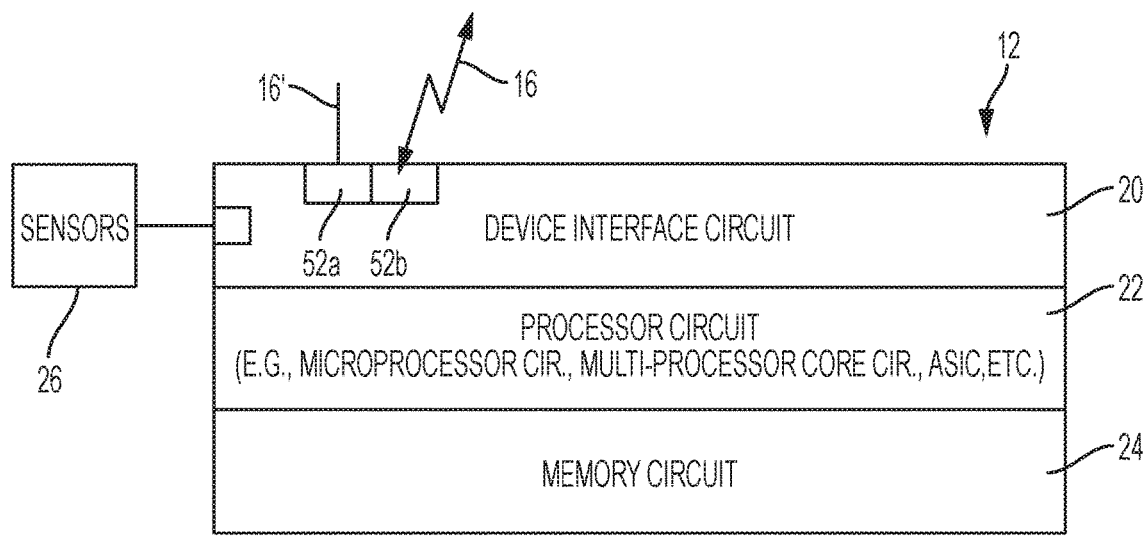
FIG. 2 illustrates an example implementation of any one of the network devices of FIG. 1, according to an example embodiment.

FIG. 2 illustrates an example implementation of any one of the network devices 12 of FIG. 1, according to an example embodiment. Each apparatus 12 can include a device interface circuit 20, a processor circuit 22, and a memory circuit 24. The device interface circuit 20 can include one or more distinct physical layer transceivers for communication with any one of the other devices 12; the device interface circuit 20 can include an IEEE based Ethernet transceiver (e.g., a wired transceiver 52a and/or a wireless transceiver 52b) for communications with the devices of FIG. 1 via any type of data link (e.g., a wireless link 16 or wired link 16', an optical link, etc.). The processor circuit 22 can be configured for executing any of the operations described herein, and the memory circuit 24 can be configured for storing any data or data packets as described herein. Each network device 12 also can include one or more sensor circuits 26 for measuring any physical or electronic parameters, for example temperature, light intensity, camera sensor, gyroscope, accelerometer, GPS receiver, etc. Each network device 12 also can include one or more actuators, for example for mobile movement within an interior building structure (e.g., a factory floor), or for robotic manipulation of physical objects (e.g., an actuator arm).

The device interface circuit 20 also can include different PHY transceivers, as appropriate, for establishing connections using various access technologies such as IEEE802.15.4 (g/e/ . . . ), IEEE802.15.1 (Bluetooth), LTE, LTE-Direct, WiFi, and/or and Power Line Communication (PLC, IEEE1901), etc. via respective access protocols.

Any of the disclosed circuits of the network devices 12 (including the device interface circuit 20, the processor circuit 22, the memory circuit 24, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 24) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 24 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer 76 of FIG. 4). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer 78 of FIG. 4). Also note that the memory circuit 24 can be implemented dynamically by the processor circuit 22, for example based on memory address assignment and partitioning executed by the processor circuit 22.

Figure 3:
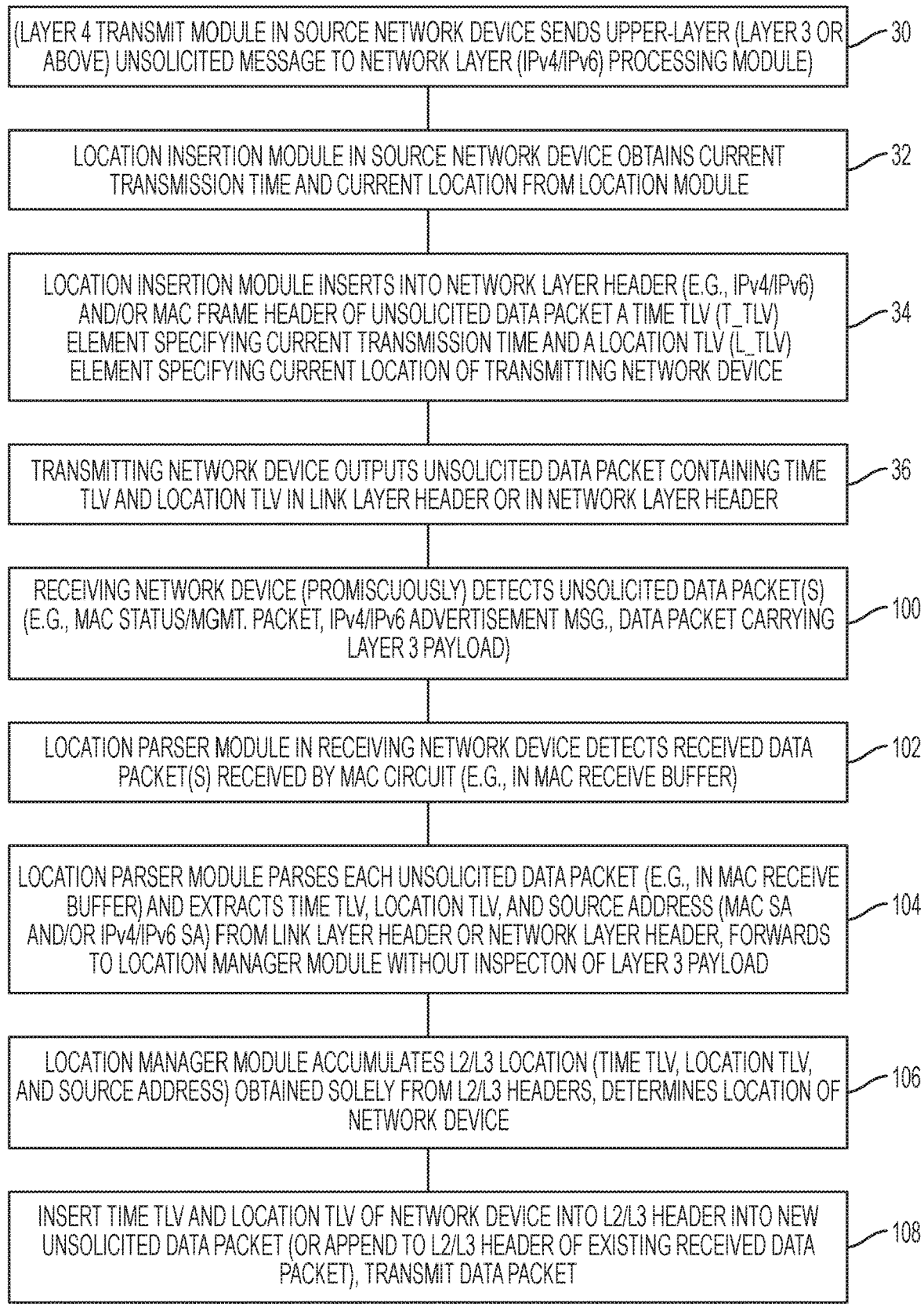
FIG. 3 illustrates an example method for opportunistic network-based location detection using neighbor location data from link layer and/or network layer headers of unsolicited data packets, according to an example embodiment.

FIG. 3 illustrates an example method for opportunistic network-based location detection using neighbor location data from link layer and/or network layer headers of unsolicited data packets, according to an example embodiment. The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 3, the processor circuit 22 of a source network devices 12b, 12c, and/or 12d in operations 30, 32, and 34 can prepare an unsolicited message for transmission in operation 36 based on inserting neighbor location data into link layer and/or network layer headers of a data packet.

FIGS. 4 and 5A-5C illustrate in further detail an example insertion of a time type-length-value (TLV) element 72 and a location TLV element 74 into a link layer header 80 and/or a network layer header 82 of an unsolicited data packet 14 by a source network device (e.g., 12b, 12c, and/or 12d), for opportunistic location detection by an apparatus 12a receiving the unsolicited data packet 14, according to an example embodiment. As illustrated in FIG. 4, the device interface circuit 20 and/or the processor circuit 22 of each network device 12 can execute a location manager module 38, a location insertion module 40, and a location parser module 42. According to the Open Systems Interconnection (OSI) reference model, a "Layer 4" level (transport layer) 44 executed for example by the processor circuit 22 of a source network device 12 can generate and send in operation 30 of FIG. 3 a transport layer messages (e.g., TCP, UDP) (54 of FIGS. 5B, 5C) to a "Layer 3" level (network layer) 46 (executed for example by the device interface circuit 20 and/or the processor circuit 22) for construction of a network layer data packet 56 of FIG. 5A. The network layer packet 56 (e.g., IPv4 data packet 56a of FIG. 5B, IPv6 data packet 56b of FIG. 5C) can optionally be sent to an IEEE-based logical link control (LLC) layer 48 (executed for example by the device interface circuit 20 and/or the processor circuit 22) for construction of an LLC header (58 of FIG. 5A). The network layer data packet 56 and the LLC header 58 can be sent to a "Layer 2" level (link layer) 50 (e.g., MAC layer) (executed for example by the device interface circuit 20 and/or the processor circuit 22) for construction of a link layer data packet 14, illustrated in FIG. 5A. The link layer data packet 14, awaiting transmission by a "Layer 1" (physical layer) transceiver (PHY) 52 in the device interface circuit 20, can be stored in a transmit buffer 76 in the device interface circuit 20 and/or the memory circuit 24 and associated with the link (MAC) layer 50.

As illustrated in FIG. 5A, the link layer data packet 14 can include a frame control field 60, a start frame delimiter (SFD) 62, a link layer destination address field 64 specifying the link layer address of a neighboring network device 12, a link layer source address field 66 specifying the link layer (MAC) address of the transmitting network device, and a type/length field 68 describing the payload 56 carried by the link layer data packet 14; the link layer data packet 14 also can include a cyclic redundancy check (CRC) field 70.

Figure 5B:
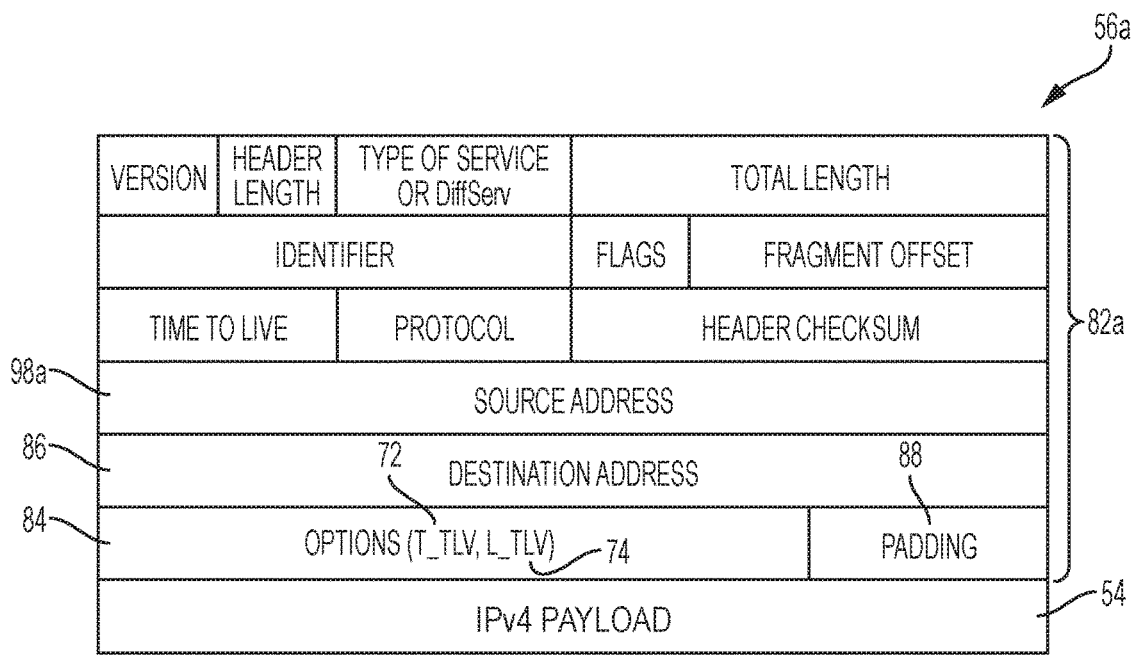
Figure 5C:
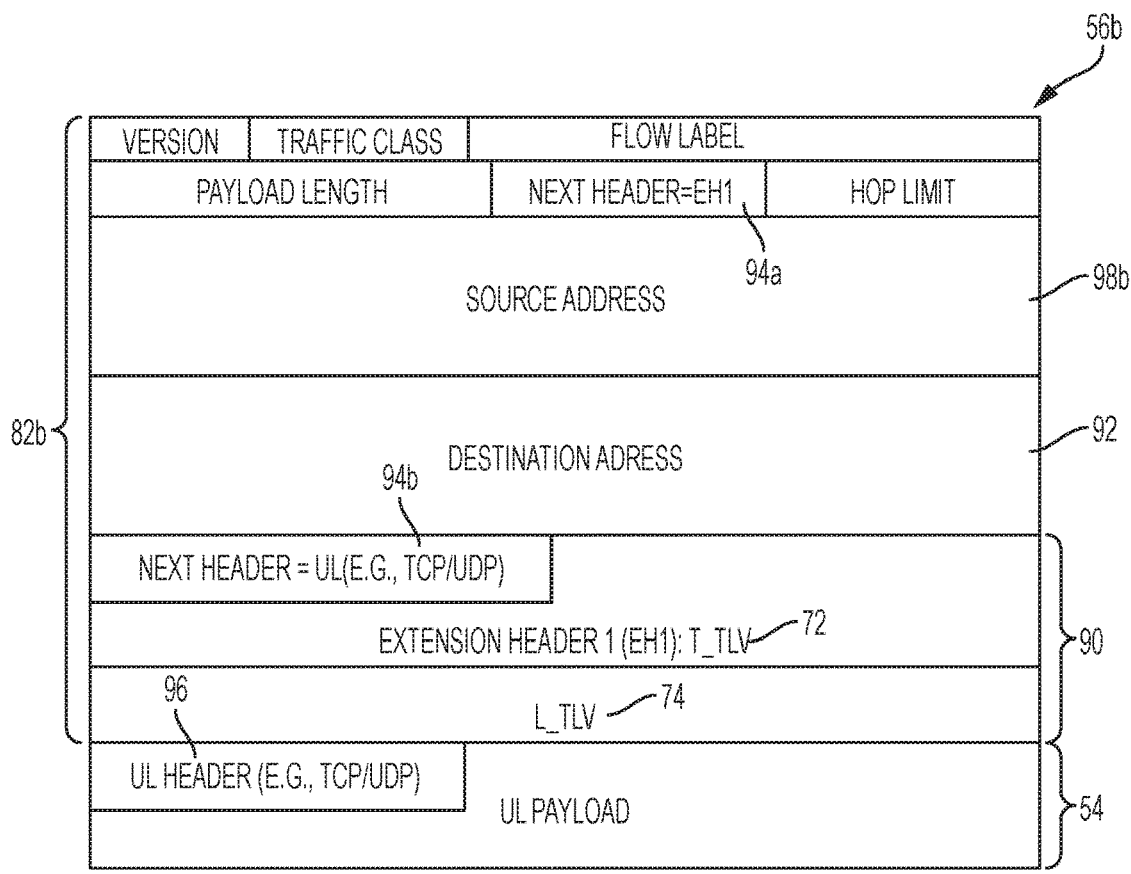

According to example embodiments, prior to transmission by the PHY layer 52 of the link layer data packet 14 the location insertion module 40 of any one of the source network devices 12b, 12c, and/or 12d in operation 32 of FIG. 3 can obtain from the location manager module 38 the current transmission time for the link layer data packet 14 scheduled for transmission from the transmit buffer 76, and the current location of the source network device 12; the location insertion module 40 of the source network device 12 can insert in operation 34 a time TLV element ("T_TLV") 72 and a location TLV element ("L_TLV") 74 into any one of the link layer header 80 in FIG. 5A or the network layer headers 82 in FIG. 5B or 5C, based on the retrieval of the current transmission time and the current location retrieved from the location manager module 38. In one embodiment, the location insertion module 40 of the source network device 12 can retrieve from the location manager module 38 the current transmission time in the form of the time TLV element 72, and the current location of the network device 12 in the form of the location TLV element 74.

For example, the location insertion module 40 of the source network device 12 in operations 32 and 34 can initially insert the location TLV element 74 in any one of the link layer header 80 and/or the network layer header 82 in response to the storage of the link layer data packet 14 in the transmit buffer 76. The location insertion module 40 can determine when the PHY layer 52 is ready to transmit the link layer data packet 14, and in response the location insertion module 40 can retrieve the current system clock time (e.g., from the location manager module 38) and insert the time TLV element 72 specifying the current clock time into the link layer header 80 and/or the network layer header 82; alternately, the location insertion module 40 can retrieve both the current system clock time and the current location for insertion of the time TLV element 72 and the location TLV element 74 into the link layer header 80 and/or the network layer header 82 in response to determining the PHY layer 52 is ready to transmit the link layer data packet 14 stored in the transmit buffer 76. The location insertion module 40 and/or the link (MAC) layer 50 can generate the CRC value for the CRC field 70 following insertion of the time TLV element 72 and the location TLV element 74.

Hence, the PHY layer 52 of the device interface circuit 20 can transmit in operation 36 the link layer data packet 14 containing the time TLV element 72 and the location TLV element 74 in at least one of the link layer header 80 or the network layer header 82. The time TLV element 72 and the location TLV element 74 inserted into the link layer header 80 and/or the network layer header 82 can be implemented using any type of recognizable format, for example as GPS waypoint location data defined for GPS Exchange Format using XML, IEEE 1588 V2, NTPv4, etc.

FIG. 5B illustrates insertion of the time TLV element 72 and the location TLV element 74 by the location insertion module 40 of the source network device 12 into a network layer header 82a of an IPv4 data packet 56a. As illustrated in FIG. 5B, the location insertion module 40 is configured for inserting the time TLV element 72 and the location TLV element 74 into an IPv4 options field 84 following the IPv4 destination address field 86 and preceding any IPv4 padding field 88 used to ensure the network layer header 82a has a size equal to an integer multiple of thirty-two (32) bits. Hence, the location insertion module 40 is configured for inserting the network layer header 82 and the location TLV element 74 after the IPv4 destination address field 86 and before the transport layer message 54 in the IPv4 data packet 56a.

FIG. 5C illustrates the insertion of the time TLV element 72 and the location TLV element 74 by the location insertion module 40 of the source network device 12 into a network layer header 82b of an IPv6 data packet 56b. As illustrated in FIG. 5C, the location insertion module 40 is configured for inserting the time TLV element 72 and the location TLV element 74 into an IPv6 extension header 90 following the IPv6 destination address field 92 and preceding the transport layer message 54 in the IPv6 data packet 56b. The IPv6 extension header 90 is identified in the network layer header 82b by a next header field 94a identifying the extension header "EH1" containing the time TLV element 72 and the location TLV element 74. The transport layer message 54 is identified in the network layer header 82b by a next header field 94b following the IPv6 destination address field 92 and preceding the IPv6 extension header 90 containing the time TLV element 72 and the location TLV element 74, where the next header field 94b identifies the next header as the upper layer "UL" header 96 of the transport layer message 54, also referred to as the upper layer (UL) payload.

Other IPv6 extension headers may be appended in the network layer header 82b before or after the IPv6 extension header 90 containing the time TLV element 72 and location TLV element 74, consistent with IPv6 protocol. As described below, multiple extension headers 90 can be appended containing the neighbor location data (comprising different and distinct time TLV elements 72 and location TLV elements 74) for respective network devices 12 along a multi-hop path; the IPv6 address of a source network device 12 also can be added with the time TLV element 72 and the location TLV element 74 to enable a destination network device to determine, for each hop identified by its IPv6 address, the respective time TLV element 72 and location TLV element 74; alternately, each IPv6 address of a source network device 12 can be added in a separate routing header (e.g. in a reverse routing header (RRH) as described in the IETF Draft by Thubert, "Reverse Routing Header" draft-thubert-6man-reverse-routing-header-01) as the link layer data packet 14 traverses a multi-hop network (e.g., data network 10).

Hence, the PHY layer 52 of any source network device 12 in operation 36 of FIG. 3 can transmit a corresponding link layer data packet 14 to a neighboring network device 12 (e.g., the receiving network device 12a) via a wired or wireless data link 16. The link layer data packet 14 can be an unsolicited link layer data packet that contains the time TLV element 72 and the location TLV element 74 in any one of the link layer header 80 of the link layer data packet 14 of FIG. 5A, the network layer header 82 of an IPv4 data packet 56a of FIG. 5B, and/or the network layer header 82b of an IPv6 data packet 56b.

Consequently, the receiving network device 12a can receive in operation 100 any one of a link layer data packet 14a specifying the corresponding time TLV element 72 and the location TLV element 74 for the network device 12b, a link layer data packet 14b specifying the corresponding time TLV element 72 and the location TLV element 74 for the network device 12c, and/or a link layer data packet 14c specifying the corresponding time TLV element 72 and the location TLV element 74 for the network device 12. As described previously, any one or all of the link layer data packets 14a, 14b, and/or 14c can be unsolicited data packets, for example a MAC status or management packet (e.g., a flow control message), an IPv4/IPv6 advertisement message (e.g., RPL DIO or DAO, etc.) or management message (e.g., ICMP, DHCP, etc.), and/or a data packet carrying a transport layer message 54. The PHY layer 52 and the link (MAC) layer 50 of the device interface circuit 20 in the receiving network device 12a can detect any one of the link layer data packets 14a, 14b, and/or 14c by unicast reception based on any one of the destination address fields 64, 86, and/or 92, multicast reception, or promiscuous detection regardless of the destination addresses specified in the received link layer data packet 14.

The location parser module 42 of the receiving network device 12a is configured for detecting in operation 102 the reception of a link layer data packet 14 as the link layer data packet 14 is stored in the corresponding receive buffer 78 of the receiving network device 12a. The location parser module 42 of the receiving network device 12a is configured for parsing in operation 104 each link layer data packet 14 (e.g., each unsolicited data packet) for each time TLV element 72 and location TLV element 74 for an identified source network device 12: the source network device 12 having generated the time TLV element 72 and the location TLV element 74 can be identified, for example, by its corresponding MAC address in the link layer source address field 66 and optionally by its IP address in the source address field 98a of FIG. 5B or 98b of FIG. 5C; optionally, the source network device 12 having generated the time TLV element 72 and the location TLV element 74 can be identified by having its corresponding MAC address and/or IPv4/IPv6 address stored with its time TLV element 72 and its location TLV element 74 in the corresponding IPv4 options field 84 of FIG. 5B or IPv6 extension header 90 of FIG. 5C (e.g., in the case of a link layer data packet 14 storing neighbor location data for multiple hops of network devices 12).

The location parser module 42 also can parse any one or both of the link layer header 80 and/or the network layer header 82 of the received link layer data packet 14 and extract the time TLV element 72, the location TLV element 74 (and MAC/IP address) for a source network device 12 having transmitted the link layer data packet 14. The location parser module 42 also can optionally generate a receipt timestamp associated with the link layer data packet 14 that indicates the time of reception of the link layer data packet 14 by the link (MAC) layer 50.

The location parser module 42 in operation 104 can forward the extracted neighbor location data (including for example, the time TLV element 72, the location TLV element 74, the MAC/IP address, and receipt timestamp) for the identified source network device 12 to the location manager module 38 of the network device 12. The location manager module 38 of the receiving network device 12a can accumulate in operation 106 in the memory circuit 24 the extracted neighbor location data for each source network device 12.

Hence, as illustrated in FIG. 1, the location manager module 38 can store in the memory circuit 24 a location map that identifies each of the source network devices 12b, 12c, and/or 12d by their respective MAC/IP addresses and respective location TLV elements 74. The location manager module 38 also can determine a time of delivery between the source network device 12 and the receiving network device 12a by comparing the corresponding time TLV element 72 with the receipt timestamp for a corresponding received link layer data packet 14 from the identified source network device 12; hence, the location manager module 38 can determine a transmission distance between the source network device 12 and the receiving network device 12a based on the time of delivery between the corresponding source network device 12 sending one or more link layer data packets 14 and the receiving network device 12a receiving the one or more link layer data packet 14a.

Hence, the location manager module 38 in the network device 12 in operation 106 can execute network-based triangulation to determine its location in the data network 10 based on correlating the transmission distances of the source network devices 12b, 12c, and/or 12d relative to the respective locations identified by the respective location TLV elements. As apparent from the foregoing, the location manager module 38 can determine the location of the receiving network device 12a without any inspection of any payload 54 following the corresponding network layer header 82 in any of the unsolicited data packets.

In response to the location manager module 38 determining the location of the receiving network device 12a, the network device 12a can act as a source network device (as described above with respect to the source network devices 12b, 12c, and/or 12d) in operations 30, 32, 34, 36, and 108 and insert its own corresponding time TLV element 72 and location TLV element 74 into the link layer header 80 and/or network layer header 82 of any link layer data packet 14 transmitted by the network device 12. The processor circuit 22 of the receiving network device 12a in operation 108 can identify one of the received unsolicited data packets (e.g., 14a) as a second unsolicited data packet to be forwarded to a destination network device (e.g., 12d), and in response the location insertion module 40 of the receiving network device 12a can append to the existing neighbor location data in the network layer header 82 of the second unsolicited data packet (e.g., 14a) its corresponding time TLV element 72 and location TLV element 74 into the network layer header 82, for example in the case where the receiving network device 12a is forwarding the data packet 14 to another neighboring network device 12 (the location insertion module 40 also can insert with the location data the corresponding MAC/IP address of the receiving network device 12a and the corresponding receipt timestamp identifying the reception time of the link layer data packet 14a).

Hence, the location insertion module 40 of the receiving network device 12a in operation 108 can append its own extension header (e.g., IPv6 extension header 90 of FIG. 5C), enabling transmission of a link layer data packet 14 having a sequence of hop-by-hop extension headers specifying for each forwarding hop the corresponding MAC/IP address, the receipt timestamp of the link layer data packet 14 by the forwarding hop, the time TLV element 72 identifying the transmission time, and the location TLV element 74 identifying the corresponding location of the forwarding hop. Hence, the destination network device (e.g., 12d) can successively determine, from the sequence of hop-by-hop extension headers, the location of each forwarding network device back to the source network device 12 that originated the data packet.

According to example embodiments, opportunistic network-based location detection can be executed by a network device, without the necessity of executing a location protocol such as IEEE 1588 V2, or without the necessity of analyzing encapsulation headers, without the need for deep packet inspection of payload data following a network layer header, etc. Hence, opportunistic network-based location detection using unsolicited data packets can be implemented by any network device, without reliance on GPS sensors, inertial sensors, location protocols, encapsulation schemes, etc. The example embodiments are particularly beneficial for indoor mobile devices that may travel along a factory floor, etc.

The example embodiments are not limited to detection of neighbor location data within unsolicited data packets, rather the example embodiments can be configured to detect the neighbor location data within any received data packet for purposes of network-based location detection. Further, the example embodiments can be used to enhance or complement existing location or navigation schemes; for example, the example embodiments can be supplied as an input to a location and navigation blending system configured to correlate location data from any available source, including the location manager module 38, an inertial system, a GNSS system, etc., enabling the location manager module 38 to enhance location detection for a network device if an inertial system or GNSS system are incapable of providing reliable location information.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
  receiving, by a network device, one or more unsolicited data packets output by a plurality of source network devices, each unsolicited data packet comprising a corresponding link layer header and a corresponding network layer header;

parsing, by the network device from each unsolicited data packet within at least one of its corresponding link layer header or corresponding network layer header, a time type-length-value (TLV) element specifying a corresponding transmission time of the data packet from one or more corresponding source network devices, and a location TLV element specifying a corresponding location of the corresponding one or more source network devices;

determining, by the network device, its corresponding location based on the time TLV elements and the location TLV elements parsed from the respective unsolicited data packets;

inserting the location of the network device into one of the corresponding link layer header or corresponding network layer header of a second unsolicited data packet; and transmitting the second unsolicited data packet containing the location of the network device; wherein the inserting includes:

identifying one of the unsolicited data packets for forwarding as the second unsolicited data packet to a destination network device, and appending the location of the network device to the location TLV element specified in the one unsolicited data packet, for transmission as the second unsolicited data packet.

2. The method of claim 1, wherein the determining includes the network device determining its corresponding location without any inspection of any payload following the corresponding network layer header in any of the unsolicited data packets.

3. The method of claim 1, wherein the receiving includes the network device promiscuously detecting at least one of the unsolicited data packets.

4. The method of claim 1, wherein the parsing of the time TLV element and the location TLV element from the corresponding link layer header or network layer header of each unsolicited data packet enables opportunistic network-based location determination of the network device, without requiring any request by the network device of any location information, without requiring any encapsulation information following the network layer header, or without any application level location detection by the network device.

5. The method of claim 1, wherein the determining includes the network device determining its corresponding location based on the time TLV elements and the location TLV elements parsed solely from the link layer headers or network layer headers of the respective data packets, relative to identification of the source network devices and a reception time of the corresponding unsolicited data packet.

6. The method of claim 1, wherein:
the network layer header of each unsolicited data packet is one of an Internet Protocol (IP) version 4 (IPv4) header, or an IPv6 header; and
the time TLV element and the location TLV element are detected within one of an options field of the IPv4 header or within an extension header of the IPv6 header.

7. An apparatus comprising:
a device interface circuit configured for receiving one or more unsolicited data packets output by a plurality of source network devices, each unsolicited data packet comprising a corresponding link layer header and a corresponding network layer header; and a processor circuit configured for parsing, from each unsolicited data packet within at least one of its corresponding link layer header or corresponding network layer header, a time type-length-value (TLV) element specifying a corresponding transmission time of the data packet from one or more corresponding source network devices, and a location TLV element specifying a corresponding location of the corresponding one or more source network devices;

the processor circuit further configured for:
determining the corresponding location of the apparatus based on the time TLV elements and the location TLV elements parsed from the respective unsolicited data packets, inserting the location of the apparatus into one of the corresponding link layer header or corresponding network layer header of a second unsolicited data packet, causing the device interface circuit to transmit the second unsolicited data packet containing the location of the network device, identifying one of the unsolicited data packets for forwarding as the second unsolicited data packet to a destination network device, and appending the location of the apparatus to the location TLV element specified in the one unsolicited data packet, for transmission as the second unsolicited data packet.

8. The apparatus of claim 7, wherein the processor circuit is configured for determining the location of the apparatus without any inspection of any payload following the corresponding network layer header in any of the unsolicited data packets.

9. The apparatus of claim 7, wherein the device interface circuit is configured for promiscuously detecting at least one of the unsolicited data packets.

10. The apparatus of claim 7, wherein the parsing of the time TLV element and the location TLV element from the corresponding link layer header or network layer header of each unsolicited data packet enables the processor circuit to execute opportunistic network-based location determination of the apparatus, without requiring any request by the apparatus of any location information, without requiring any encapsulation information following the network layer header, or without any application level location detection by the apparatus.

11. The apparatus of claim 7, wherein the processor circuit is configured for determining the location of the apparatus based on the time TLV elements and the location TLV elements parsed solely from the link layer headers or network layer headers of the respective data packets, relative to identification of the source network devices and a reception time of the corresponding unsolicited data packet.

12. The apparatus of claim 7, wherein:
the network layer header of each unsolicited data packet is one of an Internet Protocol (IP) version 4 (IPv4) header, or an IPv6 header; and
the processor circuit is configured for detecting the time TLV element and the location TLV element within one of an options field of the IPv4 header or within an extension header of the IPv6 header.

13. One or more non-transitory tangible media encoded with logic for execution by a machine and when executed by the machine operable for:
receiving, by the machine implemented as a network device, one or more unsolicited data packets output by a plurality of source network devices, each unsolicited data packet comprising a corresponding link layer header and a corresponding network layer header;

the network device parsing, from each unsolicited data packet within at least one of its corresponding link layer header or corresponding network layer header, a time type-length-value (TLV) element specifying a corresponding transmission time of the data packet from one or more corresponding source network devices, and a location TLV element specifying a corresponding location of the corresponding one or more source network devices;

the network device determining its corresponding location based on the time TLV elements and the location TLV elements parsed from the respective unsolicited data packets;

inserting the location of the network device into one of the corresponding link layer header or corresponding network layer header of a second unsolicited data packet; and transmitting the second unsolicited data packet containing the location of the network device;

wherein the inserting includes:

identifying one of the unsolicited data packets for forwarding as the second unsolicited data packet to a destination network device, and appending the location of the network device to the location TLV element specified in the one unsolicited data packet, for transmission as the second unsolicited data packet.

14. The one or more non-transitory tangible media of claim 13, wherein the parsing of the time TLV element and the location TLV element from the corresponding link layer header or network layer header of each unsolicited data packet enables opportunistic network-based location determination of the network device, without requiring any request by the network device of any location information, without requiring any encapsulation information following the network layer header, or without any application level location detection by the network device.

15. The method of claim 1, wherein the location TLV element identifies the corresponding location as a corresponding physical location of the corresponding one or more source network devices.

16. The apparatus of claim 7, wherein the location TLV element identifies the corresponding location as a corresponding physical location of the corresponding one or more source network devices.

17. The one or more non-transitory tangible media of claim 13, wherein the location TLV element identifies the corresponding location as a corresponding physical location of the corresponding one or more source network devices.

* * * * *